(12) United States Patent
Ryu

(10) Patent No.: US 9,036,988 B1
(45) Date of Patent: May 19, 2015

(54) ELECTRONIC APPARATUS

(71) Applicant: SAMSUNG ELECTRONICS CO., LTD., Suwon-si, Gyeonggi-do (KR)

(72) Inventor: Hun-young Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/285,486

(22) Filed: May 22, 2014

(30) Foreign Application Priority Data

Nov. 22, 2013 (KR) .................... 10-2013-0143251

(51) Int. Cl.
| | |
|---|---|
| *G03B 7/00* | (2014.01) |
| *G03B 9/08* | (2006.01) |
| *H04N 5/235* | (2006.01) |
| *G02B 13/00* | (2006.01) |
| *G03B 7/08* | (2014.01) |
| *G03B 7/083* | (2006.01) |

(52) U.S. Cl.
CPC .......... *H04N 5/2353* (2013.01); *G02B 13/0015* (2013.01); *G03B 7/083* (2013.01); *G03B 7/08* (2013.01)

(58) Field of Classification Search
USPC ......... 396/157, 449–452, 456, 479, 480, 484, 396/493–494, 235
See application file for complete search history.

(56) References Cited

U.S. PATENT DOCUMENTS

| | | | | |
|---|---|---|---|---|
| 5,457,514 | A * | 10/1995 | Hasuda et al. | 396/273 |
| 5,630,191 | A * | 5/1997 | Hasuda | 396/492 |
| 5,758,213 | A | 5/1998 | Goto et al. | |
| 6,072,958 | A | 6/2000 | Hasuda | |
| 7,583,312 | B2 * | 9/2009 | Hiramatsu | 348/367 |
| 7,684,692 | B2 * | 3/2010 | Kashiyama | 396/247 |
| 2011/0158635 | A1 * | 6/2011 | Hwang | 396/463 |

* cited by examiner

*Primary Examiner* — Clayton E Laballe
*Assistant Examiner* — Minh Phan
(74) *Attorney, Agent, or Firm* — Drinker Biddle & Reath LLP

(57) ABSTRACT

An electronic apparatus is disclosed. The electronic apparatus includes: an imaging device which converts light into an image signal; a lens unit positioned in front of the imaging device to form an image on the imaging device from light incident from an object; a shutter unit interposed between the lens unit and the imaging device to expose the imaging device to the light incident from the object based on a predetermined exposure time and that includes a shutter curtain that regulates the light incident from the object; and a measurement unit which measures an actual exposure time of the shutter unit. The measurement unit is positioned behind the shutter curtain and includes a light-receiving sensor which receives light incident on the measurement unit from the light incident from the object other than the light of the effective image area incident on the imaging device.

10 Claims, 10 Drawing Sheets

ELECTRONIC APPARATUS

CROSS-REFERENCE TO RELATED PATENT APPLICATIONS

This application claims the priority benefit of Korean Patent Application No. 10-2013-0143251, filed on Nov. 22, 2013, in the Korean Intellectual Property Office, the disclosure of which is incorporated herein in its entirety by reference.

BACKGROUND

1. Field

One or more embodiments of the present disclosure relate to an electronic apparatus capable of measuring an actual exposure time of a shutter unit.

2. Related Art

Lately, digital single-lens reflex (DSLR) cameras, which enable expert-level photography, are coming into wide use.

In a DSLR camera, which sends the image of an object to a viewfinder, and sends light to an imaging device for taking a picture through a single lens, a focal plane shutter is positioned in front of the imaging device to regulate the exposure time of the imaging device. The focal plane shutter is a mechanical shutter including two curtains called a front curtain and a rear curtain. The front curtain and the rear curtain travel left and right or up and down at an input shutter speed, and exposure is made through a gap between the front curtain and the rear curtain. The front curtain travels first, and the rear curtain travels in succession according to a set exposure time. During an exposure time until the rear curtain completely covers the imaging device, an image is recorded by the imaging device. The travel of the front curtain and the rear curtain is caused by elastic force of a mechanical connection, and is started by stopping application of current to an electromagnet connected to the front curtain and the rear curtain.

The shutter speed of the focal plane shutter is limited to a maximum of $1/300$ sec. A digital technique of time-divisionally receiving respective amounts of light through the gap between the front curtain and the rear curtain while the focal plane shutter travels, and then generating an output image by joining divided images together has increased the maximum shutter speed up to $1/8000$ sec. However, the divided images recorded in this way are not recorded from one scene with the same exposure. Therefore, when an object moves at a high speed, or in a situation with rapidly changing exposure such as instantaneous light, part-specific exposures may cause a separated area in an output image, or limit the highest shutter speed when divided images of strobe photography using instantaneous light are synchronized.

To overcome such limitations, it is necessary to remarkably increase the travel speed of the front curtain and the rear curtain of the focal plane shutter and set the gap between the front curtain and the rear curtain to be narrow. However, it is difficult for the travel of the front curtain and the rear curtain having mechanical structures to coincide completely with high-speed travel as described above, and there is a desire for a control method which complements the travel.

SUMMARY

One or more embodiments of the present disclosure include an electronic apparatus which may measure the actual exposure time of a shutter unit by using light incident through a lens unit and thus may correct for an error between an exposure time set for the shutter unit and the actual exposure time of the shutter unit.

Additional features will be set forth in part in the description which follows and, in part, will be apparent from the description, or may be learned by practice of the presented embodiments.

According to one or more embodiments of the present disclosure, an electronic apparatus includes: an imaging device which converts light of an effective image area incident on the imaging device into an image signal; a lens unit which is positioned in front of the imaging device to form an image on the imaging device from light incident from an object through the lens unit; a shutter unit which is interposed between the lens unit and the imaging device to expose the imaging device to the light incident from the object based on a predetermined exposure time, and includes a shutter curtain that regulates the light incident from the object; and a measurement unit which measures an actual exposure time of the shutter unit. The measurement unit is positioned behind the shutter curtain, and includes a light-receiving sensor which receives light incident on the measurement unit from the light incident from the object through the lens unit other than the light of the effective image area incident on the imaging device.

The electronic apparatus may further include a control unit which compares the predetermined exposure time of the shutter unit with the actual exposure time measured by the measurement unit, and corrects the predetermined exposure time of the shutter unit to generate a new exposure time.

The shutter unit may further include a base plate and a cover plate which are positioned in front of and behind the shutter curtain, respectively, and each of which has an aperture that forms the effective image area. The light-receiving sensor may be disposed on the cover plate. A first optical window that guides the light incident from the object through the lens unit to the light-receiving sensor may be provided outside the aperture of the base plate.

The electronic apparatus may further include a condenser lens which focuses light incident through the first optical window on the light-receiving sensor.

The condenser lens may be supported by the base plate.

The condenser lens may be supported by the cover plate.

The shutter curtain may include a front curtain assembly and a rear curtain assembly. The shutter unit may further include a separating curtain which is interposed between the front curtain assembly and the rear curtain assembly and has an aperture corresponding to the effective image area. A second optical window open in succession to the first optical window may be provided in the separating curtain.

The second optical window may have a shape of a concave notch recessed from an edge of the separating curtain.

The second optical window may have a shape of a slit formed by removing a portion of the separating curtain inwardly distanced apart from an edge of the separating curtain.

A longitudinal axis of the slit may extend in a travel direction of the front curtain assembly and the rear curtain assembly.

The electronic apparatus may further include a mount unit on which the lens unit is mounted and which defines an incident area through which the light incident from the object is incident on the shutter unit. A third optical window for the light incident on the measurement unit may be provided outside the incident area of the mount unit.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
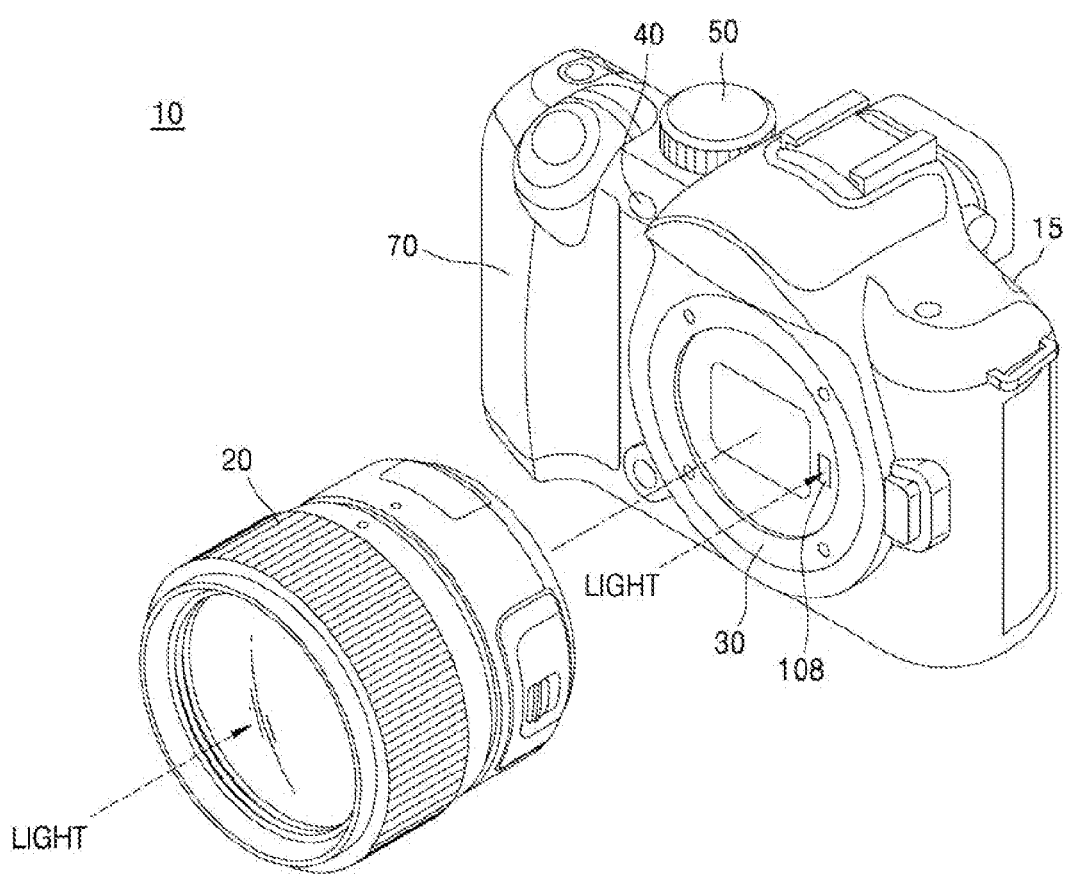
FIG. 1 is a partially exploded perspective view illustrating an electronic apparatus according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain features of the present description.

Figure 2:
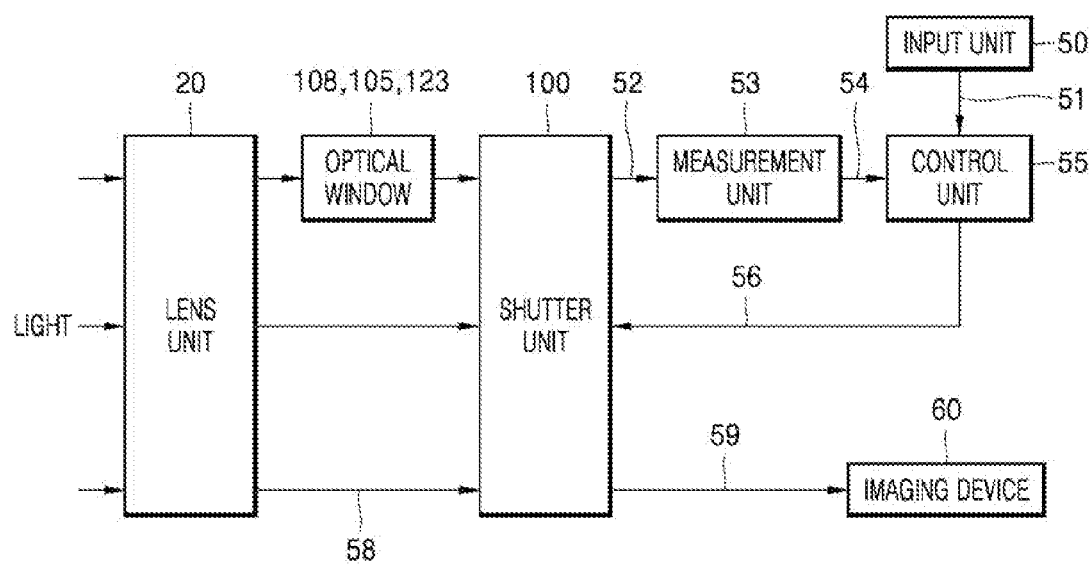
FIG. 2 is a block diagram illustrating a structure capable of controlling the exposure time of the electronic apparatus shown in FIG. 1.

FIG. 1 is a partially exploded perspective view illustrating an electronic apparatus, such as an imaging apparatus 10 or other electronic apparatus having image capturing capabilities, according to an embodiment, and FIG. 2 is a block diagram illustrating a structure capable of controlling an exposure time of the imaging apparatus 10 shown in FIG. 1.

Referring to FIGS. 1 and 2, the imaging apparatus 10 includes a lens unit 20 and a body 15 on which the lens unit 20 may be mounted. The lens unit 20 is an optical unit which passes light 58 incident from an object, and may be attached to a mount unit 30 included in a frame 70 of the imaging apparatus 10 and mounted on the body 15. The lens unit 20 is positioned in front of an imaging device 60, which is described below, to form an image on the imaging device 60 from the light 58 incident from the object. Although not shown in FIG. 1, the imaging device 60, which may convert the light incident through the lens unit 20 into an image signal, for example, a charge-coupled device (CCD) or a complementary metal-oxide semiconductor (CMOS) imaging device, and a shutter unit 100, which is interposed between the lens unit 20 and the imaging device 60 to regulate light, are provided in the body 15. The shutter unit 100 exposes the imaging device 60 to light based on a predetermined exposure time. The shutter unit 100 may be, for example, a focal plane shutter including one or more shutter curtains 141, 142, 151, or 152 (e.g., a front curtain assembly 140 and a rear curtain assembly 150 of FIG. 3) which travel up and down or left and right based on the predetermined exposure time. In the body 15, one or more of a button 40 or an input unit 50 may be provided to set the predetermined exposure time (e.g., a set exposure time) of the shutter unit 100.

With the development of photography, a high-speed shutter is used. Therefore, the travel speed of the shutter curtains 141, 142, 151, and 152 increases, and a gap between the shutter curtains 141, 142, 151, and 152 is set to be small so that an exposure time of the shutter unit 100 set through the input unit 50 (e.g., the set exposure time) may differ from an actual exposure time of the shutter unit 100. In particular, when the focal plane shutter travels at a high speed, a difference may occur between the set exposure time and the actual exposure time of the shutter unit 100, and a separated area may be generated in an output image. Therefore, a control unit 55 capable of correcting the difference may be included in the imaging apparatus 10.

Referring to FIG. 2, a measurement unit 53 and the control unit 55 for correcting the error between the set exposure time and the actual exposure time of the shutter unit 100 may be provided in the imaging apparatus 10.

The measurement unit 53 serves to measure the actual exposure time of the shutter unit 100, and may have a light-receiving sensor 250 (see FIG. 3) capable of receiving light. As the shutter curtains 141, 142, 151, and 152 (see FIG. 3) travel, light may be incident on the light-receiving sensor 250. The actual exposure time of the light incident on the light-receiving sensor 250 is measured by the measurement unit 53 and transmitted to the control unit 55. The control unit 55 determines an error between a set exposure time 51 and an actual exposure time 54 by comparing the set exposure time 51 of the shutter unit 100 set through the input unit 50 with the actual exposure time 54 of the shutter unit 100 measured by the measurement unit 53, generates a new exposure time 56 by correcting the error, and transmits the new exposure time 56 to the shutter unit 100, so that accurate exposure may be performed by the imaging device 60.

Since the actual exposure time 54 of the shutter unit 100 may be measured by measuring the incident time of light incident on the light-receiving sensor 250 through the shutter unit 100, even light which has not been incident on the imaging device 60, may be used to measure the actual exposure time 54 of the shutter unit 100 as long as the light has passed through the shutter unit 100 at the same moment as an imaging time point (e.g., when incident light for the output image reaches the imaging device 60). Referring to FIGS. 1 and 2, the measurement unit 53 of this embodiment is positioned behind the shutter curtains 141, 142, 151, and 152, on a side of the imaging device 60, and receives light incident through the lens unit 20 other than light of an effective image area D (FIG. 5A) incident on the imaging device 60. Light 59 incident on the imaging device 60 and light 52 received incident on the measurement unit 53 have different incident paths, but may be incident from a same object and have passed the shutter unit 100 at the same imaging time point. Therefore, by using the light 52 received in the measurement unit 53, the actual exposure time 54 of the shutter unit 100 may be measured.

Figure 3:
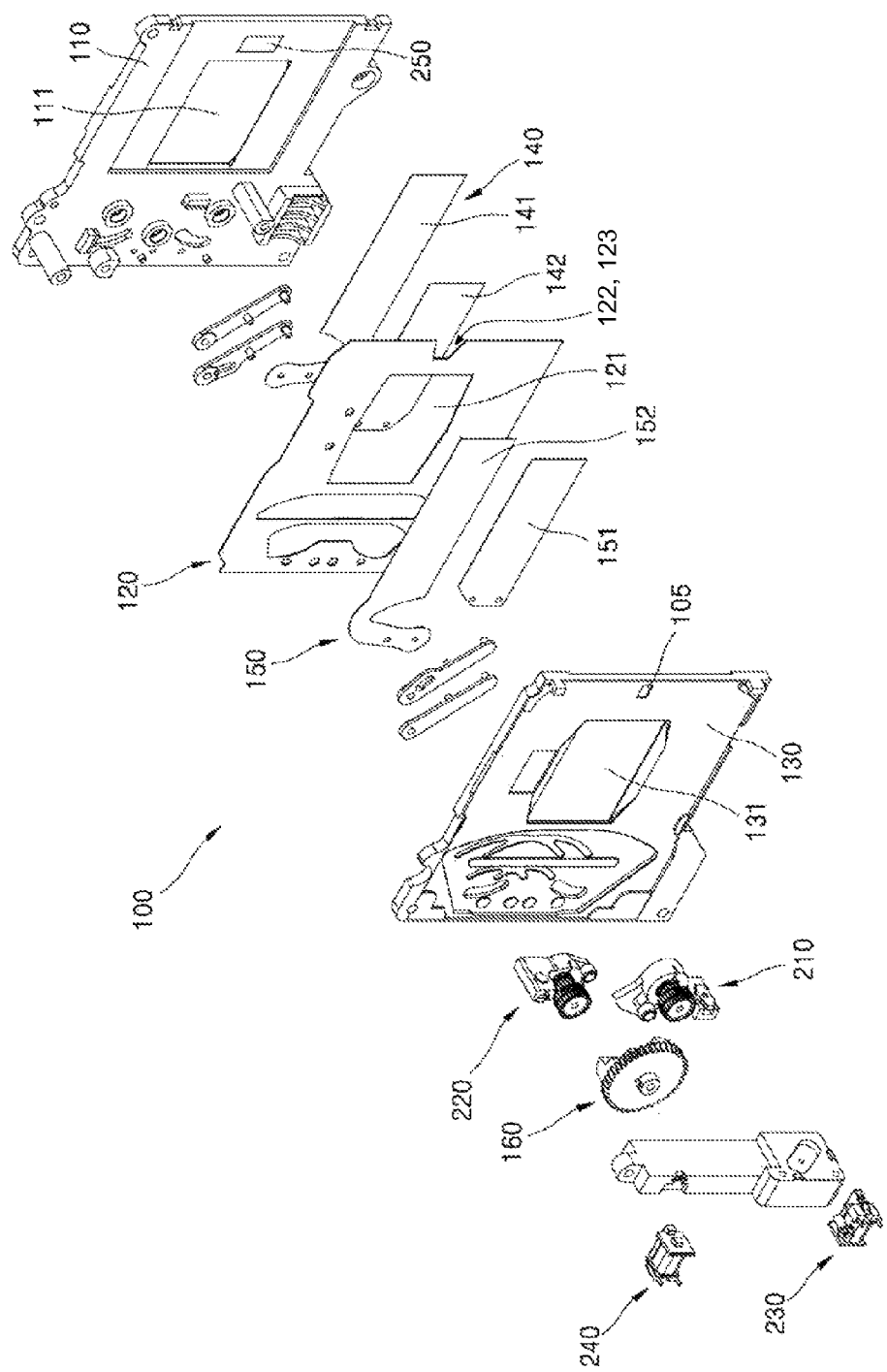
FIG. 3 is an exploded perspective view illustrating a shutter unit according to an embodiment.
Figure 4:
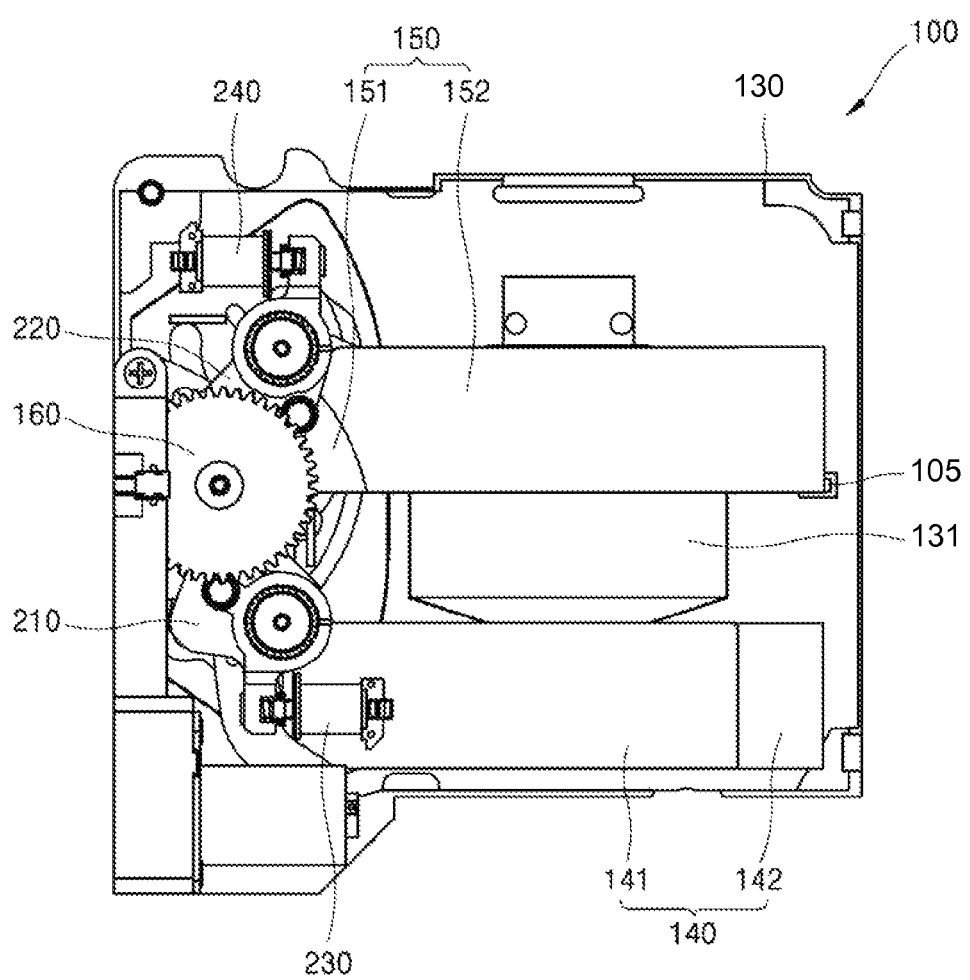
FIG. 4 is a front view illustrating the shutter unit shown in FIG. 3 according to an embodiment.

FIG. 3 is an exploded perspective view illustrating the shutter unit 100 according to an embodiment, and FIG. 4 is a front view illustrating the shutter unit 100 shown in FIG. 3 according to the embodiment. FIG. 4 illustrates a structure in which a cover plate 110 and a separating curtain 120 shown in FIG. 3 are omitted.

Referring to FIGS. 3 and 4, the shutter unit 100 includes a cover plate 110, the base plate 130, the shutter curtains 141, 142, 151, and 152 (e.g., the front curtain assembly 140 and the rear curtain assembly 150), a cam 160, a front curtain lever 210, a rear curtain lever 220, a front curtain magnet 230, and a rear curtain magnet 240.

The base plate 130 and the cover plate 110 are respectively disposed in front of and behind the shutter curtains 141, 142, 151, and 152 (e.g., the front curtain assembly 140 and the rear curtain assembly 150). The cover plate 110 is the base of the shutter unit 100, and the front curtain assembly 140, the separating curtain 120, and the rear curtain assembly 150 are disposed on the cover plate 110. The base plate 130 may be coupled to the cover plate 110. On the base plate 130, various components, such as the cam 160, the front curtain lever 210, the rear curtain lever 220, the front curtain magnet 230, the rear curtain magnet 240, and the like, may be disposed. The shutter unit 100 is interposed between the front curtain assembly 140 and the rear curtain assembly 150, and may have the separating curtain 120 which separates the front curtain assembly 140 and the rear curtain assembly 150. The separating curtain 120 is interposed between the front curtain assembly 140 and the rear curtain assembly 150, thereby serving as a guide during a travel of the curtains and also serving to prevent interference between the front curtain assembly 140 and the rear curtain assembly 150.

The front curtain assembly 140 and the rear curtain assembly 150 may be formed of a cloth curtain or a metal curtain. The front curtain assembly 140 and the rear curtain assembly 150 are disposed to neighbor each other, and control open or close of an aperture 111. In other words, when the front curtain assembly 140 and the rear curtain assembly 150 are disposed close to each other, and there is no gap between the front curtain assembly 140 and the rear curtain assembly 150, the aperture 111 is closed. On the other hand, when the front curtain assembly 140 and the rear curtain assembly 150 are spaced apart from each other, the aperture 111 is opened.

The front curtain lever 210 is disposed on the base plate 130 and is formed to be rotatable about a front curtain lever axis. The front curtain lever 210 is interposed between the cam 160 and the front curtain assembly 140, and serves to transfer the rotational force of the cam 160 to the front curtain assembly 140 so that the front curtain assembly 140 may rotate based on the rotation of the cam 160. The rear curtain lever 220 is disposed on the base plate 130 and formed to be rotatable about a rear curtain level axis. The rear curtain lever 220 is interposed between the cam 160 and the rear curtain assembly 150, and serves to transfer the rotational force of the cam 160 to the rear curtain assembly 150 so that the rear curtain assembly 150 may rotate based on the rotation of the cam 160.

The front curtain magnet 230 is formed on one side of the front curtain lever 210, and the rear curtain magnet 240 is formed on one side of the rear curtain lever 220. When current is applied to the front and rear curtain magnets 230 and 240, the front and rear curtain magnets 230 and 240 have predetermined magnetic forces, thus serving as electromagnets. As the front and rear curtain magnets 230 and 240 serve as electromagnets, the positions of the front curtain lever 210 and the rear curtain lever 220 are fixed by the magnetic forces provided by the front and rear curtain magnets 230 and 240 until an imaging time point.

Apertures 111, 121, and 131 through which light may pass are formed in portions of the cover plate 110, the separating curtain 120, and the base plate 130, respectively, and the imaging device 60 is disposed behind the aperture 111 of the cover plate 110. The apertures 111, 121, and 131 form the effective image area D (FIG. 5A) for exposing the imaging device 60. Some apertures 111 and 121 among the apertures 111, 121, and 131 are opened and closed by the front curtain assembly 140 and the rear curtain assembly 150.

Figure 5A:
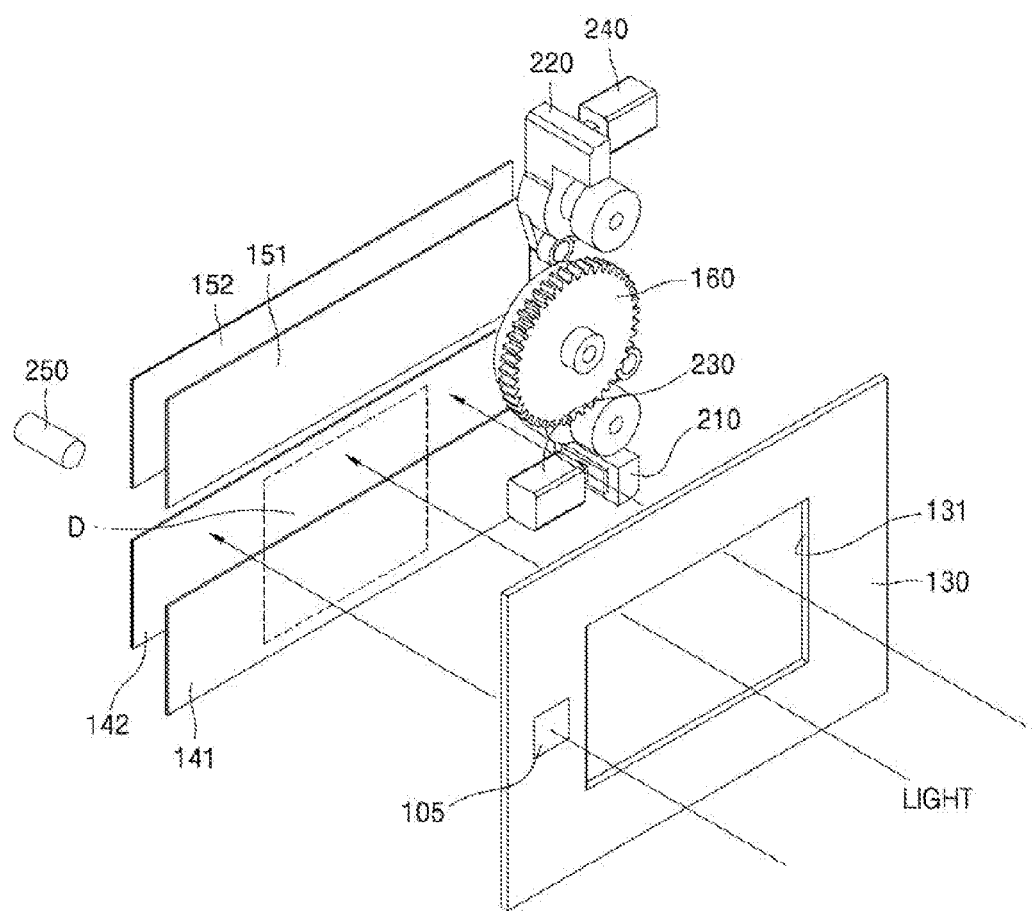
FIG. 5A to FIG. 5C are perspective views schematically showing a process in which light passing through first and second optical windows is incident on a light-receiving sensor according to the travel sequence of front and rear curtain assemblies.

As illustrated in FIG. 3, to the right of the aperture 131 in the base plate 130, a first optical window 105 is formed in a right portion of the base plate 130. The first optical window 105 guides the light incident through the lens unit 20 to the light-receiving sensor 250. When the separating curtain 120 is further included, a second optical window 123 open in succession to the first optical window 105 is provided in a right portion of the separating curtain 120. For example, the second optical window 123 may have the shape of a concave notch 122 formed by recessing a right edge (as illustrated in FIG. 3) of the separating curtain 120. On a right portion of the cover plate 110, the light-receiving sensor 250 is disposed. The positions of the first optical window 105, the second optical window 123, and the light-receiving sensor 250 are not limited to the right portions of the base plate 130, the separating curtain 120, and the cover plate 110, respectively, and may be formed outside the respective apertures 131, 121, and 111 so that light incident on the light-receiving sensor 250 through the first and second optical windows 105 and 123 does not interfere with light passing through the apertures 131, 121, and 111. The first optical window 105, the second optical window 123, and the light-receiving sensor 250 may be disposed in an area in which light passing through the first optical window 105 is regulated by travel of the front curtain assembly 140 and the rear curtain assembly 150 outside the effective image area D (FIG. 5A). However, the first optical window 105, the second optical window 123, and the light-receiving sensor 250 are arranged along a line so that the light passing through the first optical window 105 is incident on the light-receiving sensor 250 via the second optical window 123.

Figure 5B:
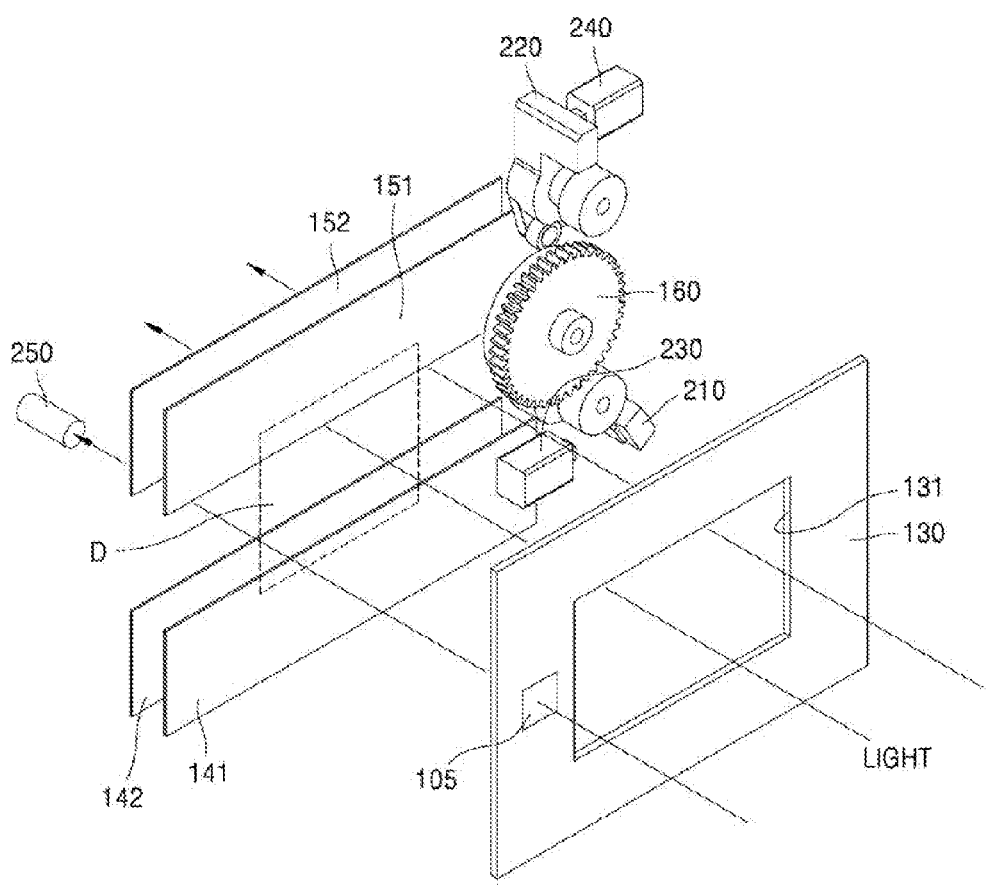
Figure 5C:
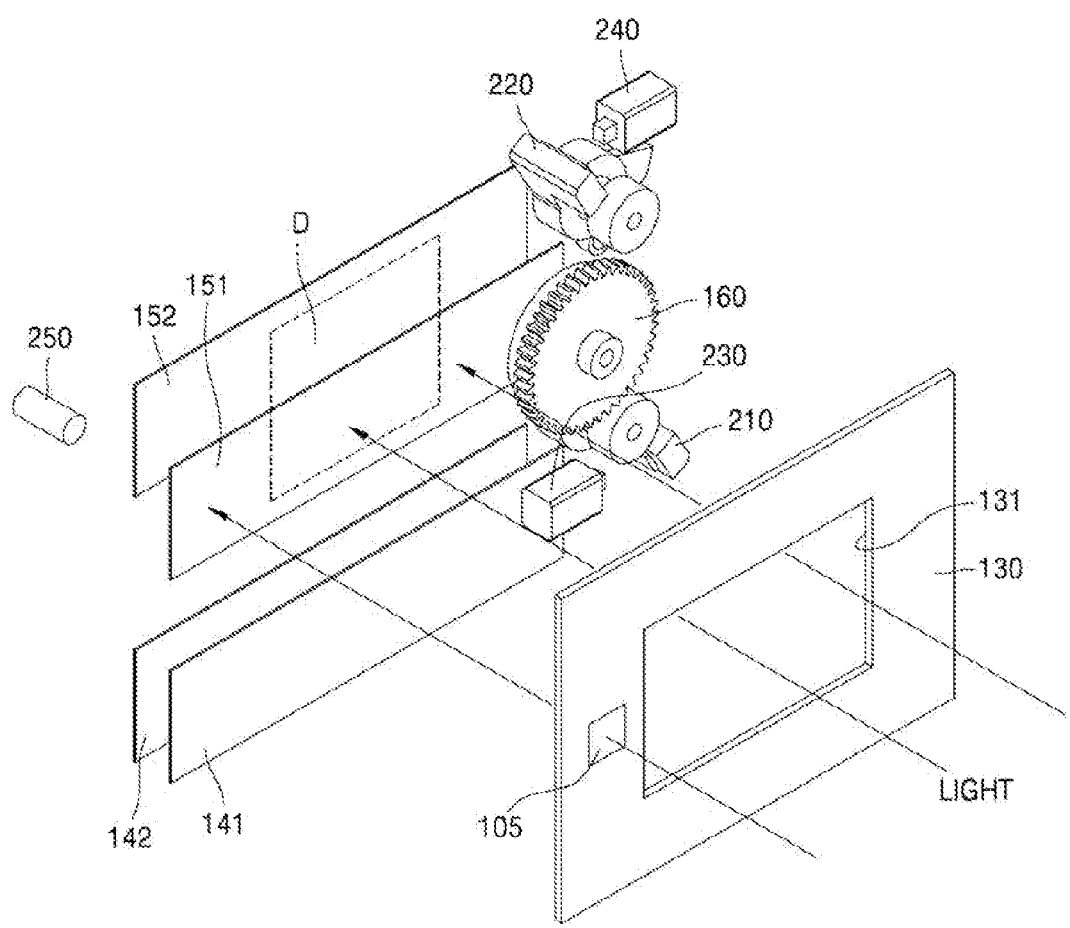

FIGS. 5A to 5C are perspective views schematically showing a process in which light passing through the first and second optical windows 105 and 123 is incident on the light-receiving sensor 250 based on a travel sequence of the front and rear curtain assemblies 140 and 150.

Referring to FIGS. 5A to 5C, the front and rear curtain assemblies 140 and 150 open or close the aperture 111 of the cover plate 110, that is, the effective image area D in which an image may be converted into an electric signal by an imaging device such as the imaging device 60 (not shown in FIG. 5A, 5B, or 5C). As shown in FIGS. 5A and 5C, when both the front and rear curtain assemblies 140 and 150 are moved up or down, the effective image area D is closed. On the other hand, as shown in FIG. 5B, when the front curtain assembly 140 is moved down and the rear curtain assembly 150 is moved up, the effective image area D is exposed so that light incident through the lens unit 20 may be incident on the imaging device 60. The front curtain lever 210 is interposed between the cam 160 and the front curtain assembly 140, and rotates the front curtain assembly 140 as the cam 160 rotates. Thus, by transferring the rotational force of the cam 160 to the front curtain assembly 140, the rise and fall of the front curtain assembly 140 may be adjusted. The rise and fall of the rear curtain assembly 150 are substantially the same as those of the front curtain assembly 140 described above, and the detailed description thereof will be omitted.

As shown in FIGS. 5A and 5C, when both the front and rear curtain assemblies 140 and 150 are moved up or down, an optical path between the first and second optical windows 105 and 123 and the light-receiving sensor 250 is closed. On the other hand, as shown in FIG. 5B, when the front curtain assembly 140 is moved down and the rear curtain assembly 150 is moved up, the optical path between the first and second optical windows 105 and 123 and the light-receiving sensor 250 is opened so that the light incident through the lens unit 20 may be incident on the light-receiving sensor 250.

In this way, the rays of light which arrive at the light-receiving sensor 250 and the imaging device 60 through the front curtain assembly 140 and the rear curtain assembly 150 differ in optical path, but have the same incident time.

Therefore, by measuring the incident time of light incident on the light-receiving sensor 250 through the front curtain assembly 140 and the rear curtain assembly 150, the actual exposure time 54 of the shutter unit 100 may be measured. However, to prevent interference with the light passing through the effective image area D, the light-receiving sensor 250 is disposed on a side portion outside the effective image area D, and to cause light to be incident on the light-receiving sensor 250 disposed on the side portion, the first and second optical windows 105 and 123 are provided in the shutter unit 100.

According to related art, a sensing unit, which has a light-receiving unit and a light-emitting unit, is disposed in a base plate, and a reflecting plate, which reflects light emitted from the light-emitting unit to the light-receiving unit, is disposed in a cover plate so that the actual shutter speed of the shutter is measured. However, according to various embodiments described herein, external light passing through the lens unit 20 is directly received so that the actual shutter speed of the shutter unit 100 may be measured. Since it is unnecessary to provide the light-emitting unit and the reflecting plate in the shutter unit 100, the thickness and size of the shutter unit 100 are reduced, and production cost may be reduced. Also, the reduction in the size of the shutter unit 100 may result in a reduction in the overall size of the imaging apparatus 10.

Figure 6A:
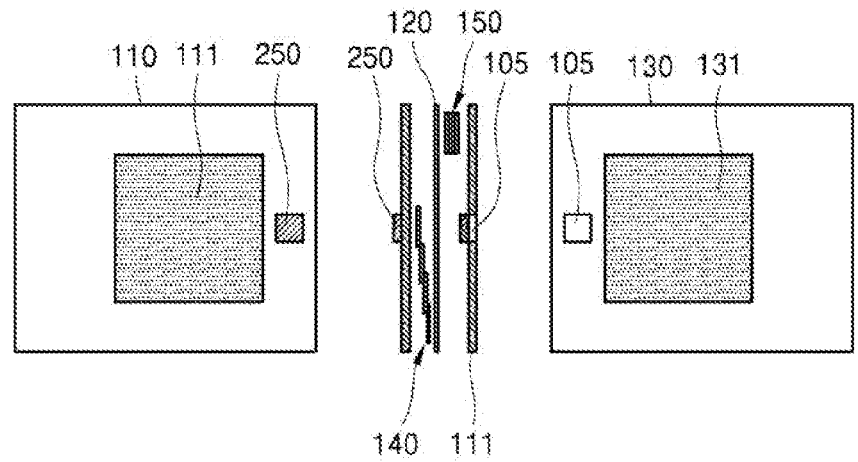
FIG. 6A is a schematic cross-sectional view of the shutter unit shown in FIG. 5A to FIG. 5C, a front view of the cover plate 110, and a rear view of the base plate 130.
Figure 6B:
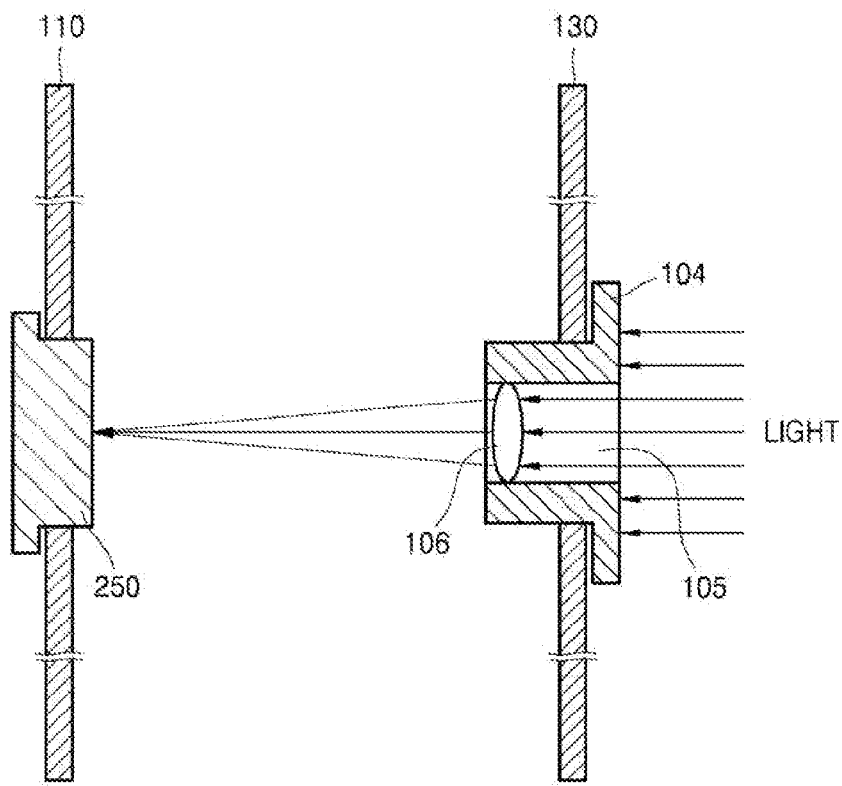
FIG. 6B is a schematic cross-sectional view illustrating a shutter unit in which a condenser lens is supported by a base plate.
Figure 6C:
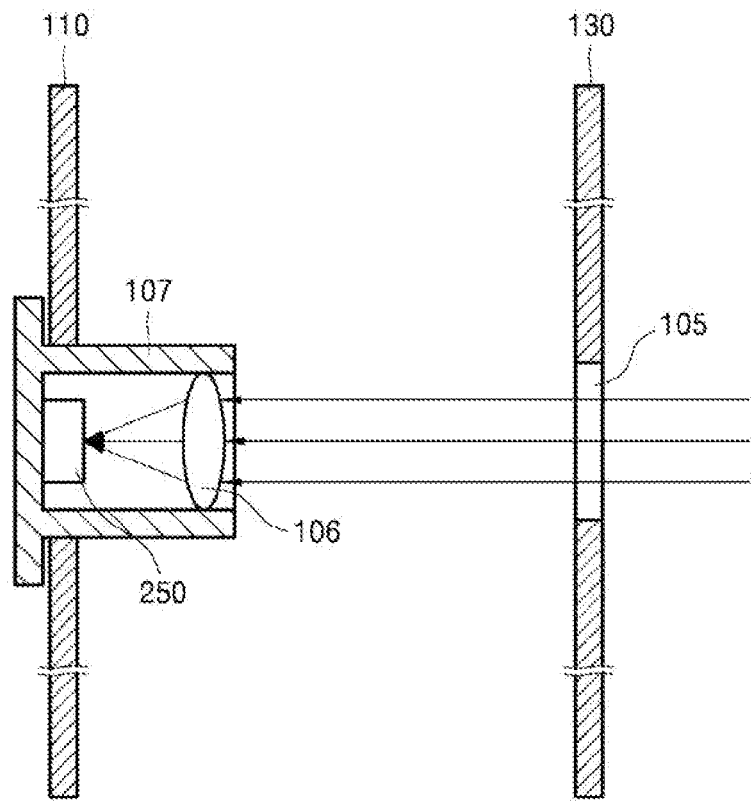
FIG. 6C is a schematic cross-sectional view illustrating a shutter unit in which a condenser lens is supported by a cover plate.

FIG. 6A is a schematic cross-sectional view of the shutter unit 100 shown in FIG. 5A to FIG. 5C, a front view of the cover plate 110, and a rear view of the base plate 130. FIG. 6B is a schematic cross-sectional view illustrating a shutter unit 100 in which a condenser lens 106 is supported by the base plate 130. FIG. 6C is a schematic cross-sectional view illustrating a shutter unit 100 in which the condenser lens 106 is supported by the cover plate 110. In FIGS. 6B and 6C, the separating curtain 120, the front curtain assembly 140, and the rear curtain assembly 150 shown in FIG. 6A are omitted.

Referring to FIG. 6A, the front curtain assembly 140, the separating curtain 120, and the rear curtain assembly 150 are interposed between the cover plate 110 and the base plate 130. The light-receiving sensor 250 is disposed on the cover plate 110, and the first optical window 105 is disposed in the base plate 130.

Light received in the light-receiving sensor 250 is incident from outside the imaging apparatus 10. Therefore, when photography is performed in a dark environment, a sufficient amount of light to measure the actual exposure time 54 of the shutter unit 100 may not be incident on the light-receiving sensor 250. Referring to FIG. 6B, the condenser lens 106 is disposed in a first optical window unit 104 in which the first optical window 105 is provided. Also, referring to FIG. 6C, a light-receiving sensor unit 107 including the light-receiving sensor 250 is disposed in the cover plate 110, and the condenser lens 106 is disposed in front of the light-receiving sensor 250. According to this implementation, a sufficient amount of light to measure the incident time of light received in the light-receiving sensor 250 may be incident on the light-receiving sensor 250 even in a dark environment. Accordingly, even without disposing either a light-emitting unit or a reflecting plate to ensure an additional light source, the actual exposure time 54 of the shutter unit 100 may be measured in a dark environment. Neither a light-emitting unit nor a reflecting plate is provided to the shutter unit 100 so that the thickness and size of the shutter unit 100 are reduced, and accordingly, production cost may be reduced. Also, the reduction in the size of the shutter unit 100 may result in a reduction in the overall size of the imaging apparatus 10.

The position of the condenser lens 106 is not limited to the first optical window unit 104 shown in FIG. 6B or the light-receiving sensor unit 107 shown in FIG. 6C, and may be disposed anywhere in the path of light which is incident on the light-receiving sensor 250 through an optical window.

Since the separating curtain 120 is interposed between the front curtain assembly 140 and the rear curtain assembly 150, light passing through the first optical window 105 does not arrive at the light-receiving sensor 250 without passing through the front curtain assembly 140 and the separating curtain 120. To pass light, for example, the second optical window 123 having the shape of the concave notch 122 may be provided in the separating curtain 120, as shown in FIG. 3. The shape of the concave notch 122 is formed by recessing the edge of the separating curtain 120.

Figure 7:
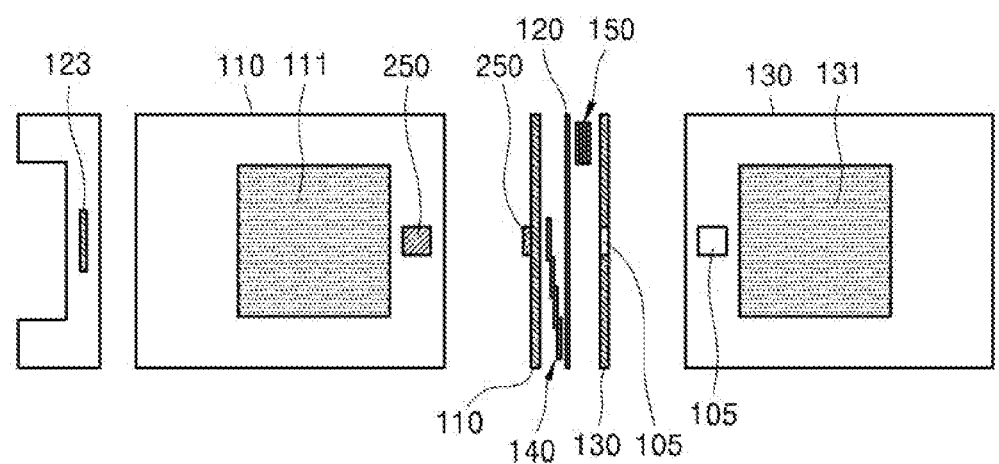
FIG. 7 is a schematic cross-sectional view illustrating a shutter unit in which a second optical window having a slit shape is provided in a separating curtain according to an embodiment, a front view of the cover plate 110, a rear view of the base plate 130 and a partial front view of the separating curtain 120 including the second optical window 123.

FIG. 7 is a schematic cross-sectional view illustrating a shutter unit 100 in which the second optical window 123 having a slit shape is provided in the separating curtain 120, a front view of the cover plate 110, a rear view of the base plate 130, and a partial front view of the separating curtain 120 including the second optical window 123. Referring to FIG. 7, to cause light to be incident on the light-receiving sensor 250, the second optical window 123 having a slit shape is provided on a side portion of the separating curtain 120. The second optical window 123 having a slit shape is formed at a position which is inwardly distanced apart from the edge of the separating curtain 120. The longitudinal axis of the second optical window 123 having a slit shape extends in the travel direction of the front curtain assembly 140 and the rear curtain assembly 150, which travel at a high speed.

As described above, the separating curtain 120 serves as a travel guide of the front curtain assembly 140 and the rear curtain assembly 150. Since this embodiment employs the second optical window 123 having a slit shape which extends in the travel direction of the front curtain assembly 140 and the rear curtain assembly 150, a problem that travel of the front curtain assembly 140 and the rear curtain assembly 150 is blocked by the second optical window 123 may be reduced.

Figure 8A:
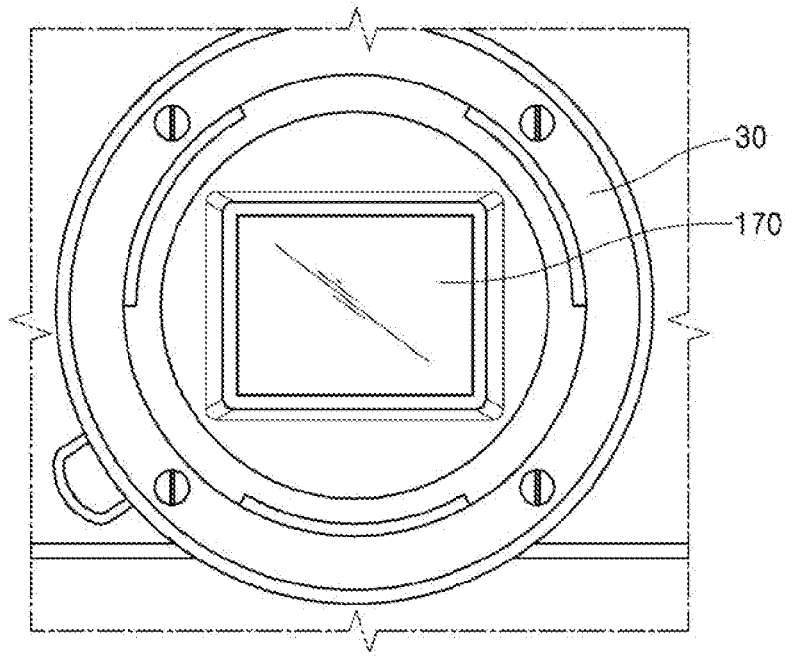
FIG. 8A is a front view of a mount unit according to an embodiment.
Figure 8B:
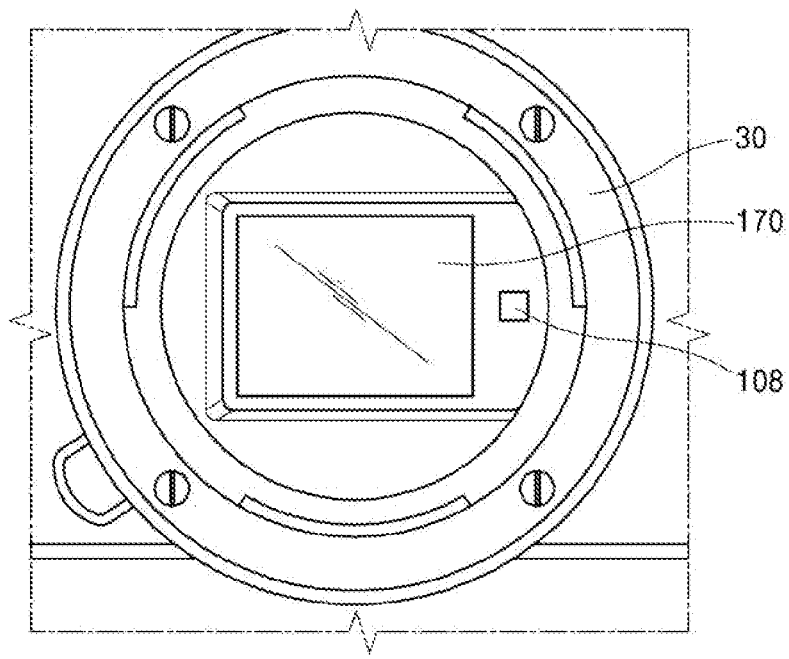
FIG. 8B is a front view of a mount unit in which a third optical window is provided according to an embodiment.

FIG. 8A is a front view of the mount unit 30 according to an embodiment, and FIG. 8B is a front view of the mount unit 30 according to another embodiment.

Referring to FIG. 8A, an incident area 170 through which light is incident on the shutter unit 100 is defined by the mount unit 30. The light incident through the incident area 170 of the mount unit 30 is incident on the imaging device 60 and also incident on the measurement unit 53 to measure the actual exposure time 54 of the shutter unit 100.

Referring to FIG. 8B, a third optical window 108 is provided outside the incident area 170 of the mount unit 30. Light incident through the incident area 170 is incident on the imaging device 60. Light incident through the third optical window 108 is incident on the measurement unit 53 and used to measure the actual exposure time. To this end, the third optical window 108 is disposed in a straight line with the first and second optical windows 105 and 123. This implementation may ensure that the incident area 170 has a sufficient size to expose the imaging device 60.

As described above, according to various embodiments, when an optical window is provided in an imaging apparatus, the actual exposure time of an imaging device may be measured without an additional light source, and the structure of a shutter may be readily provided. Accordingly, it is possible to achieve a reduction in the production cost of an imaging apparatus and reduction in size of a shutter and the imaging apparatus.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. While one or more embodiments have been described with reference to the figures, it will be understood by those of ordinary skill in the art that various changes in form and details may be made therein without departing from the spirit and scope of the present disclosure as defined by the following claims.

What is claimed is:

1. An electronic apparatus comprising:
an imaging device which converts light of an effective image area incident on the imaging device into an image signal;
a lens unit which is positioned in front of the imaging device to form an image on the imaging device from light incident from an object through the lens unit;
a shutter unit which is interposed between the lens unit and the imaging device to expose the imaging device to the light incident from the object based on a predetermined exposure time, and comprises a shutter curtain that regulates the light incident from the object, and a base plate and a cover plate which are positioned in front of and behind the shutter curtain, respectively, and each of which has an aperture that forms the effective image area; and a measurement unit which measures an actual exposure time of the shutter unit;

wherein the measurement unit is positioned behind the shutter curtain, and comprises a light-receiving sensor which receives light incident on the measurement unit from the light incident from the object through the lens unit other than the light of the effective image area incident on the imaging device, and a first optical window that guides the light incident from the object through the lens unit to the light-receiving sensor is provided outside the aperture of the base plate and a condenser lens which focuses light incident through the first optical window on the light-receiving sensor is provided in the first optical window.

2. The electronic apparatus of claim 1, further comprising a control unit which compares the predetermined exposure time of the shutter unit with the actual exposure time measured by the measurement unit, and corrects the predetermined exposure time of the shutter unit to generate a new exposure time.

3. The electronic apparatus of claim 1, wherein the light-receiving sensor is disposed on the cover plate.

4. The electronic apparatus of claim 1, wherein the condenser lens is supported by the base plate.

5. The electronic apparatus of claim 1, wherein the condenser lens is supported by the cover plate.

6. The electronic apparatus of claim 3, wherein the shutter curtain comprises a front curtain assembly and a rear curtain assembly, the shutter unit further comprises a separating curtain which is interposed between the front curtain assembly and the rear curtain assembly and has an aperture corresponding to the effective image area, and a second optical window open in succession to the first optical window is provided in the separating curtain.

7. The electronic apparatus of claim 6, wherein the second optical window has a shape of a concave notch recessed from an edge of the separating curtain.

8. The electronic apparatus of claim 6, wherein the second optical window has a shape of a slit formed by removing a portion of the separating curtain inwardly distanced apart from an edge of the separating curtain.

9. The electronic apparatus of claim 8, wherein a longitudinal axis of the slit extends in a travel direction of the front curtain assembly and the rear curtain assembly.

10. The electronic apparatus of claim 1, further comprising a mount unit on which the lens unit is mounted and which defines an incident area through which the light incident from the object is incident on the shutter unit, wherein a third optical window for the light incident on the measurement unit is provided outside the incident area of the mount unit.

* * * * *